(12) United States Patent
Lee et al.

(10) Patent No.: US 6,750,604 B2
(45) Date of Patent: Jun. 15, 2004

(54) FIELD EMISSION DISPLAY PANELS INCORPORATING CATHODES HAVING NARROW NANOTUBE EMITTERS FORMED ON DIELECTRIC LAYERS

(75) Inventors: Cheng-Chung Lee, Hsinchu (TW); Jane-Hway Liao, Hsinchu (TW); Hua-Chi Cheng, Hsinchu (TW); Wen-Chun Wang, Taichung (TW)

(73) Assignee: Industrial Technology Research Institute, Hsin Chu (TW)

( * ) Notice: Subject to any disclaimer, the term of this patent is extended or adjusted under 35 U.S.C. 154(b) by 80 days.

(21) Appl. No.: 09/864,013

(22) Filed: May 23, 2001

(65) Prior Publication Data

US 2002/0175618 A1 Nov. 28, 2002

(51) Int. Cl.⁷ .................................. H01J 1/02
(52) U.S. Cl. ................... 313/495; 313/336; 313/309; 313/351; 313/497
(58) Field of Search .................. 313/309, 310, 313/311, 336, 351, 326, 495, 496, 497, 346 R; 445/50, 51; 345/75

(56) References Cited

U.S. PATENT DOCUMENTS

| | | | | |
|---|---|---|---|---|
| 5,939,823 A | * | 8/1999 | Kiyomiya et al. | 313/495 |
| 6,057,637 A | * | 5/2000 | Zettl et al. | 313/310 |
| 6,400,091 B1 | * | 6/2002 | Deguchi et al. | 315/169.1 |
| 6,407,502 B2 | * | 6/2002 | Hidler | 313/505 |
| 6,414,433 B1 | * | 7/2002 | Moore | 313/582 |
| 6,472,802 B1 | * | 10/2002 | Choi et al. | 313/309 |

* cited by examiner

*Primary Examiner*—Ashok Patel
(74) *Attorney, Agent, or Firm*—Tung & Associates

(57) ABSTRACT

A field emission display panel device that incorporates carbon nanotube emitter layers for emitting electrons wherein the carbon nanotube layers has a smaller width than the conductive paste layers it is deposited on is disclosed. The width of the carbon nanotube layer should be less than ¾ of the width of the conductive paste layer, or in a range between about ¼ and ¾ of the width of the conductive paste layer, i.e. such as a silver paste layer. The present invention novel structure prevents the overflow of the carbon nanotubes, after a curing process for the nanotubes is conducted, onto the sidewall of the conductive paste layer, and thus significantly improves the electron density projected toward the flourescent powder coating layer to produce an image with reduced electron scattering. As a result, image clarity, definition and contrast can be improved in the FED device.

19 Claims, 3 Drawing Sheets

FIELD EMISSION DISPLAY PANELS INCORPORATING CATHODES HAVING NARROW NANOTUBE EMITTERS FORMED ON DIELECTRIC LAYERS

FIELD OF THE INVENTION

The present invention generally relates to field emission display panel and a method for fabricating and more particularly, relates to a emission display panel that incorporates cathodes fabricated with a narrow nanotube emitter layer on top of a wide dielectric layer and a method for such fabrication.

BACKGROUND OF THE INVENTION

In recent years, flat panel display devices have been developed and used in electronic applications such as personal computers. One of the popularly used flat panel display device is an active matrix liquid crystal display which provides improved resolution. However, liquid crystal display device has many inherent limitations that render it unsuitable for a number of applications. For instance, liquid crystal displays have numerous fabrication limitations including a slow deposition process for coating a glass panel with amorphous silicon, high manufacturing complexity and low yield. Moreover, the liquid crystal display devices require a fluorescent back light which draws high power while most of the light generated is wasted. A liquid crystal display image may be difficult to see under bright light conditions or at wide viewing angles which further limit its use in many applications.

Other flat panel display devices have been developed in recent years to replace the liquid crystal display panels. One of such devices is a field emission display device that overcomes some of the limitations of LCD and provides significant advantages over the traditional LCD devices. For instance, the field emission display devices have higher contrast ratio, larger viewing angle, higher maximum brightness, lower power consumption and a wider operating temperature range when compared to a conventional thin film transistor (TFT) liquid crystal display panel.

A most drastic difference between a FED and a LCD is that, unlike the LCD, FED produces its own light source utilizing colored phosphors. The FEDs do not require complicated, power-consuming back lights and filters and as a result, almost all the light generated by a FED is visible to the user. Moreover, the FEDs do not require large arrays of thin film transistors, and thus, a major source of high cost and yield problems for active matrix LCDs is eliminated.

In a FED, electrons are emitted from a cathode and impinge on phosphors coated on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate electrode which extracts electrons from the cathode and accelerates them toward the phosphor coating. The emission current, and thus the display brightness, is strongly dependent on the work function of the emitting material. To achieve the necessary efficiency of a FED, the cleanliness and uniformity of the emitter source material are very important.

In order for the electron to travel in a FED, most FEDs are evacuated to a low pressure such as $10^{-7}$ torr in order to provide a log mean free path for the emitted electrons and to prevent contamination and deterioration of the microtips. The resolution of the display can be improved by using a focus grid to collimate electrons drawn from the microtips.

In the early development for field emission cathodes, a metal microtip emitter of molybdenum was utilized. In such a device, a silicon wafer is first oxidized to produce a thick silicon oxide layer and then a metallic gate layer is deposited on top of the oxide. The metallic gate layer is then patterned to form gate openings, while subsequent etching of the silicon oxide underneath the openings undercuts the gate and creates a well. A sacrificial material layer such as nickel is deposited to prevent deposition of nickel into the emitter well. Molybdenum is then deposited at normal incidence such that a cone with a sharp point grows inside the cavity until the opening closes there above. An emitter cone is left when the sacrificial layer of nickel is removed.

In an alternate design, silicon microtip emitters are produced by first conducting a thermal oxidation on silicon and then followed by patterning the oxide and selectively etching to form silicon tips. Further oxidation or etching protects the silicon and sharpens the point to provide a sacrificial layer. In another alternate design, the microtips are built onto a substrate of a desirable material such as glass, as an ideal substrate for large area flat panel displays. The microtips can be formed of conducting materials such as metals or doped semi-conducting materials. In this alternate design for a FED device, an interlayer that has controlled conductivity deposited between the cathode and the microtips is highly desirable. A proper resistivity of the interlayer enables the device to operate in a stable condition. In fabricating such FED devices, it is therefore desirable to deposit an amorphous silicon film which has electrical conductivity in an intermediate range between that of intrinsic amorphous silicon and $n^+$ doped amorphous silicon. The conductivity of the $n^+$ doped amorphous silicon can be controlled by adjusting the amount of phosphorous atoms contained in the film.

Generally, in the fabrication of a FED device, the device is contained in a cavity of very low pressure such that the emission of electrons is not impeded. For instance, a low pressure of $10^{-7}$ torr is normally required. In order to prevent the collapse of two relatively large glass panels which form the FED device, spacers must be used to support and provide proper spacing between the two panels. For instance, in conventional FED devices, glass spheres or glass crosses have been used for maintaining such spacings in FED devices. Elongated spacers have also been used for such purpose.

Referring initially to FIG. 1A wherein an enlarged, cross-sectional view of a conventional field emission display device 10 is shown. The FED device 10 is formed by depositing a resistive layer 12 of typically an amorphous silicon base film on a glass substrate 14. An insulating layer 16 of a dielectric material and a metallic gate layer 18 are then deposited and formed together to provide metallic microtips 20 and a cathode structure 22 is covered by the resistive layer 12 and thus, a resistive but somewhat conductive amorphous silicon layer 12 underlies a highly insulating layer 16 which is formed of a dielectric material such as $SiO_2$. It is important to be able to control the resistivity of the amorphous silicon layer 12 such that it is not overly resistive but yet, it will act as a limiting resistor to prevent excessive current flow if one of the microtips 20 shorts to the metal layer 18.

A completed FED structure 30 including anode 28 mounted on top of the structure 30 is shown in FIG. 1B. It is to be noted, for simplicity reasons, the cathode layer 22 and the resistive layer 12 are shown as a single layer 22 for the cathode. The microtips 20 are formed to emit electrons 26 from the tips of the microtips 20. The gate electrodes 18 are provided with a positive charge, while the anode 28 is provided with a higher positive charge. The anode 28 is formed by a glass plate 36 which is coated with phosphorous particles 32. An intermittent conductive layer of indium-tin-oxide (ITO) layer 34 may also be utilized to further improve the brightness of the phosphorous layer when bombarded by electrons 26. This is shown in a partial, enlarged cross-sectional view of FIG. 1C. The total thickness of the FED device is only about 2 mm, with vacuum pulled in-between the lower glass plate 14 and the upper glass plate 36 sealed by sidewall panels 38 (shown in FIG. 1B).

The conventional FED devices formed by microtips shown in FIGS. 1A–1C produce a flat panel display device of improved quality when compared to liquid crystal display devices. However, a major disadvantage of the microtip FED device is the complicated processing steps that must be used to fabricate the device. For instance, the formation of the various layers in the device, and specifically, the formation of the microtips requires a thin film deposition technique utilizing a photolithographic method. As a result, numerous photomasking steps must be performed in order to define and fabricate the various structural features in the FED. The CVD deposition processes and the photolithographic processes involved greatly increase the manufacturing cost of a FED device.

In a co-pending application Ser. No. 09/377,315 filed Aug. 19, 1999, assigned to the common assignee of the present invention, a field emission display device and a method for fabricating such device of a triode structure using nanotube emitters as the electron emission sources were disclosed. In the triode structure FED device, the device is constructed by a first electrically insulating plate, a cathode formed on the first electrically insulating plate by a material that includes metal, a layer formed on the cathode of a high electrical resistivity material, a layer of nanotube emitters formed on the resistivity layer of a material of carbon, diamond or diamond-like carbon wherein the cathode, the resistivity layer and the nanotube emitter layer form an emitter stack insulated by an insulating rib section from adjacent emitter stacks, a dielectric material layer perpendicularly overlying a multiplicity of the emitter stacks, a gate electrode on top of the dielectric material layer, and an anode formed on a second electrically insulating plate overlying the gate electrode. The FED device proposed can be fabricated advantageously by a thick film printing technique at substantially lower fabrication cost and higher fabrication efficiency than the FEDs utilizing microtips. However, three separate electrodes are still required for the device, i.e., a cathode, a gate electrode and an anode which must be formed in separate process steps.

In another co-pending application Ser. No. 09/396,536 filed Sep. 15, 1999, assigned to the common assignee of the present invention, a field emission display device and a method for fabricating the diode structure device using nanotube emitters as the electron emission sources were disclosed. In the diode structure FED device, the device is constructed by a first glass plate that has a plurality of emitter stacks formed on a top surface, each of the emitter stacks is formed parallel to a transverse direction of the glass plate and includes a layer of electrically conductive material such as silver paste and a layer of nanotube emitter on top. The first glass plate has a plurality of rib sections formed of an insulating material in-between the plurality of emitter stacks to provide electrical insulation. A second glass plate is positioned over and spaced-apart from the first glass plate with an inside surface coated with a layer of an electrically conductive material such as indium-tin-oxide. A multiplicity of fluorescent powder coating strips is then formed on the ITO layer each for emitting a red, green or blue light when activated by electrons emitted from the plurality of emitter stacks. The field emission display panel is assembled together by a number of side panels that joins the peripheries of the first and second glass plate together to form a vacuum-tight cavity therein. The FED device disclosed in this application can be fabricated with only two electrodes, i.e., the first electrode coated on the bottom glass panel and the second electrode coated on the top glass plate without the use of a gate electrode in-between the two plates. In this configuration, the electron emitted from the nanotube emitters do not strike the phosphor coating layer on the top glass plate as hard as they would have when a gate electrode is utilized.

Various other fabrication and performance problems have been encountered in the above-described triode and diode structured FED's. For instance, in the triode structure FED's, the fabrication process is more complex and thus more difficult to achieve products of high reliability. The thickness of the insulating dielectric layer and the spacing between the electrodes must be formed with high precision in order to achieve reliability. In the diode structure FED's, the distance between the cathode of phosphor coating and the anode of nanotube emitters must not be larger than 100 $\mu$m. This limitation must be met in order to produce an operating field at 5 volts/$\mu$m in a nanotube emitter type FED so that the driving voltage required stays in a reasonable range, i.e. smaller than 500 volts. The small distance allowed between the top plate (the anode) and the bottom plate (the cathode) causes other processing difficulties such as that of achieving a high vacuum in the cavity between the two plates, particularly when display panels of large dimensions are fabricated; and that of scattered electrons when only two electrodes are used resulting in reduced intensity and poor image quality.

In the present design of field emission display devices utilizing carbon nanotubes as the electron emission source, the carbon nanotubes are coated onto a conductive paste layer by a thick film printing method. Either a diode structure or a triode structure field emission display device can be fabricated by the thick film printing method for forming the carbon nanotube emitters. This is shown in FIGS. 2A and 3B.

FIG. 2A illustrates a conventional diode structure FED 40 which is constructed by a top glass substrate 42 and a bottom glass substrate 44. On the top glass substrate 42, is formed an electrical conductive layer, or an electrode 46 with a fluorescent powder coating layer 48 deposited sequentially onto the top surface of the top glass substrate 42. On the bottom glass substrate 44, is first deposited an electrode layer 50 of a material such as a conductive paste or a silver paste. On top of the electrode layer 50, or the cathode 50, is then thick film printed a carbon nanotube layer 52 with the carbon nanotubes 54 exposed and pointed upwardly, as shown in FIG. 2A. However, after a necessary curing process for the nanotube layer 52 is conducted at a high temperature, the carbon nanotube layer 52 flows and covers the conductive paste layer 50, as shown in FIG. 2B. In the end structure formed and shown in FIG. 2B, the distribution of the carbon nanotubes 54 cannot be controlled and furthermore, the electric field distribution on the edge is quite different than the electric field distribution on the top of the carbon nanotube layer 52. As a result, the carbon nanotubes on the edge of layer 52 has a higher electron emission density, i.e. easier to emit electrons from the edge of layer 52. This leads to a uniformity and poor contrast in the image produced on the field emission display device.

Similar defects have been discovered in a triode structure FED 60, as shown in FIGS. 3A and 3B. In the triode structure FED 60, a second cathode 62 is formed by a dielectric layer 64 and a conductive paste layer 66 similar to that shown in FIGS. 2A and 2B for the diode structure, during the curing process for the carbon nanotube layer 52, the layer overflows and covers the edge of the conductive paste layer 50. This results in a similarly undesirable effect of a non-uniform electric field due to the higher density carbon nanotubes formed on the edge of the carbon nanotube layer 52. In the case of the triode structure FED 60, more electrons are lost due to the bombardment of the electrons onto the secondary cathode 62. The percentage of electrons actually reach the flourescent coating 48 is therefore reduced resulting in a reduction in the intensity and contrast of the FED display. It is therefore necessary to provide a new structure for either a diode or a triode FED device that does not have carbon nanotubes formed on the sidewall of a conductive paste layer such that the intensity, the definition and the contrast of the display panel can be improved.

It is therefore an object of the present invention to provide a field emission display panel of either a diode or a triode structure that does not have the drawbacks or shortcomings of the conventional field emission display panels.

It is another object of the present invention to provide a field emission display panel wherein a cathode is formed by a narrow layer of carbon nanotubes on top of a wide layer of conductive paste.

It is a further object of the present invention to provide a field emission display panel wherein the nanotube emitters are formed by a nanotube emitter layer of a smaller width on top of a conductive paste layer of a larger width such that the sidewalls of the conductive paste layer is not covered by any nanotubes after a curing process.

It is still another object of the present invention to provide a field emission display panel wherein a nanotube emitter is formed by a layer of nanotubes having a second width on top of a layer of conductive paste having a first width, the second width is less than ¾ of the first width.

It is yet another object of the present invention to provide a field emission display panel wherein a nanotube emitter is formed by a layer of nanotube material having a second width deposited on a layer of conductive paste material having a first width, the second width is between about ¼ and about ¾ of the first width.

It is still another further object of the present invention to provide a method for fabricating a field emission display panel by forming a nanotube emitter with a nanotube layer on top of a conductive paste layer wherein the nanotube layer has a width that is less than ¾ of the width of the conductive paste layer.

SUMMARY OF THE INVENTION

In accordance with the present invention, a field emission display panel that incorporates nanotube emitters formed by a nanotube emitter layer having a second width on top of a conductive paste layer having a first width is provided. The second width of the nanotube emitter layer is less than ¾ of the first width of the conductive paste layer. The second width of the nanotube emitter layer may be between about ¼ and about ¾ of the first width of the conductive paste layer.

In a preferred embodiment, a field emission display panel is provided which includes a first electrically insulating plate; a plurality of emitter stacks formed on the first electrically insulating plate, each of the emitter stacks is positioned parallel to a transverse direction of the first insulating plate and includes a layer of a first electrically conductive material that has a first width and a layer of nanotube emitter that has a second width on top, the second width is less than ¾ of the first width; a plurality of rib sections formed of an insulating material in between the plurality of emitter stacks providing electrical insulation therein between; a second electrically insulating plate is positioned over and spaced apart from the first electrical insulating plate that has an inside surface facing the first plate; a layer of a second electrically conductive material on the inside surface of the second insulating plate; a multiplicity of strips of flourescent powder on the second electrically conductive material each for emitting a red, green or blue light upon activation by electrons emitted by the plurality of emitter stacks; and a plurality of side panels joining peripheries of the first and second electrically insulating plates together forming a vacuum-tight cavity therein.

In the field emission display panel, the second width of the layer of nanotube emitter is between about ¼ and about ¾ of the first width of the layer of first electrically conductive material. The second electrically insulating plate may further include a black matrix layer between the multiplicity of strips of fluorescent powder coating. The first and second electrically insulating plates are formed of a ceramic material that is essentially transparent. The layer of a first electrically conductive material is a cathode for the FED panel, while the layer of the first electrically conductive material may be a silver paste. The layer of the second electrically conductive material is a first anode for the FED panel, which may be formed of indium-ti-oxide. The layer of nanotubes may be formed of a mixture of nanometer dimensioned hollow tubes and a binder material, the nanotube emitter layer may be formed of a mixture of nanometer dimensioned hollow tubes of carbon, diamond or diamond-like carbon and a polymeric-based binder. Each of the multiplicity of strips of flourescent powder coating emits a light of red, green or blue that is different than the light emitted by its immediate adjacent strips when activated by electrons from the pluralities of emitter stacks. The field emission display panel may further include a second layer of the first electrically conductive material formed on top of the plurality of rib sections for functioning as a second anode.

The present invention is further directed to a method for fabricating a field emission display panel by the operating steps of first providing a first electrically insulating plate; forming a plurality of emitter stacks on the first electrically insulating plate by a thick film printing method parallel to a transverse direction of the first plate, each of the emitter stacks includes a layer of a first electrically conductive material that has a first width and a layer of nanotube emitters that has a second width on top, the second width is less than ¾ of the first width; forming a plurality of rib sections from an electrically insulating material in between the plurality of emitter stacks to provide electrical insulation therein between; providing a second electrically insulating plate; forming a second electrical conductive material on an inside surface of the second electrically insulating plate facing the first electrically insulating plate when the first and the second plates are assembled together; forming a multiplicity of flourescent coating strips on the layer of electrically conductive material for emitting a red, green or blue light when activated by electrons; and joining the first and second electrical insulating plates together by side panels and forming a vacuum-tight cavity therein.

In the method for fabricating a field emission display panel, the second width may be between about ¼ and about ¾ of the first width. The method may further include the step of printing the layer of a first electrically conductive material in a silver paste, or the step of printing the layer of nanotube emitter from a mixture of a binder and nanometer dimensioned hollow fibers selected from the group consisting of carbon fibers, diamond fibers and diamond-like carbon fibers. The method may further include the step of connecting a negative charge to the first electrically conductive material underlying the plurality of emitter stacks and a positive charge to the layer of second electrically conductive material, or the step of coating a black matrix layer on the second electrically insulating plate in between the multiplicity of strips of flourescent powder coating. The multiplicity of flourescent powder coating may be formed by a thick film printing technique. The method may further include a step of depositing a layer of the first electrically conductive material on top of the plurality of rib sections for functioning as a second anode.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a field emission display panel of either diode or triode structure wherein a nanotube emitter layer is used as an electron emitter. In the nanotube emitter, an emitter layer of reduced width is deposited on top of a conductive paste later, such that, after a curing process for the nanotube emitter layer is conducted, the nanotubes do not overflow onto the peripheral sidewall of the conductive paste layer. Any scattering of electrons from the sidewall nanotubes is therefore completely eliminated. It has been found that the nanotube emitter layer should have a width that is less than ¾ of the width of the conductive paste layer onto which it is deposited. It has further been found that the width of the nanotube emitter layer should be between about ¼ and about ¾ of the width of the conductive paste layer in order to prevent such overflow after a curing process.

The invention further discloses a method for fabricating a field emission display panel utilizing carbon nanotube emitters as the electron emission source wherein a nanotube emitter layer having a width that is not more than ¾ of a width of the conductive paste onto with the nanotube is deposited is provided. The narrower width of the nanotube emitter layer when compared to the width of the conductive paste layer onto which it is deposited prevents any possible overflow of the nanotube emitter layer over a sidewall of the conductive paste layer. As a result, any scattering of electrons emitted from the nanotubes on the peripheral surface of the conductive paste can be completely eliminated.

Figure 4A:
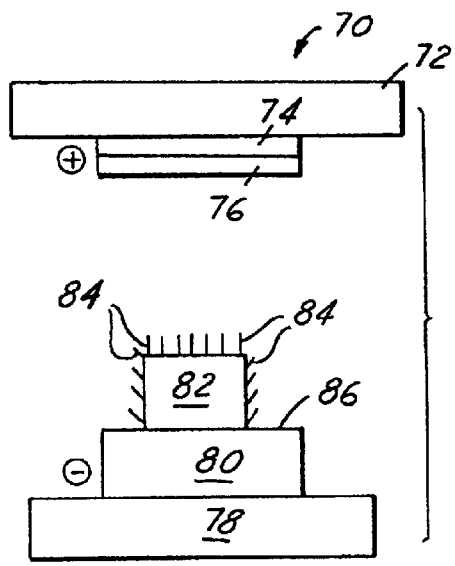
FIG. 4A is an enlarged, cross-sectional view of a present invention diode structure FED device wherein the nanotube layer has a reduced width.

Referring now to FIG. 4A wherein a present invention diode structure FED structure is shown. In the FED device 70, a top glass panel 72 which has an electrode layer 74 and a flourescent powder coating layer 76 deposited thereon is positioned opposite to a bottom glass substrate 78. On top of the bottom glass substrate 78 is deposited a conductive paste material such as a silver paste forming layer 80 of a pre-determined width. A carbon nanotube layer 82 having a second width smaller than the first width for layer 80 is then deposited on top by a thick film printing technique. It is seen that the carbon nanotubes 84 sticking out on both the top surface and a peripheral sidewall surface of the layer 82. The second width of the nanotube emitter layer 82 should be less than ¾ of the first width of the conductive paste layer 80. The second width of the nanotube emitter layer 82 can further be limited in a range between about ¼ and about ¾ of the first width of the conductive paste layer 80. The word "about" used in this writing indicates a range of values that is within ±10% of the average values given.

Figure 1A:
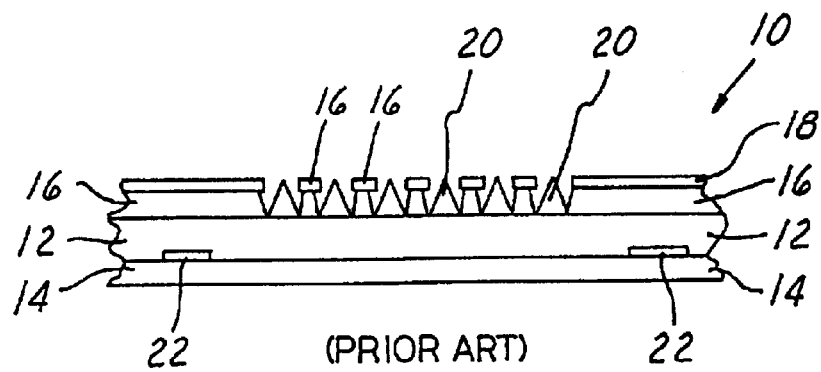
FIG. 1A is an enlarged, cross-sectional view of a conventional field emission display device utilizing micro-tips for electron emissions.
Figure 1B:
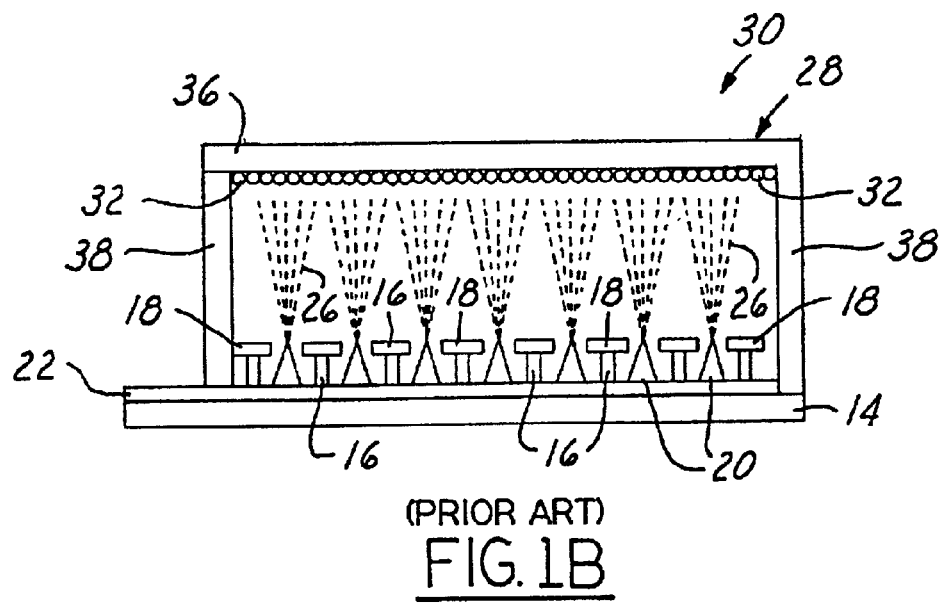
FIG. 1B is an enlarged, cross-sectional view of the conventional field emission display device of FIG. 1A further including an anode and sidewall panels forming a sealed chamber.
Figure 1C:
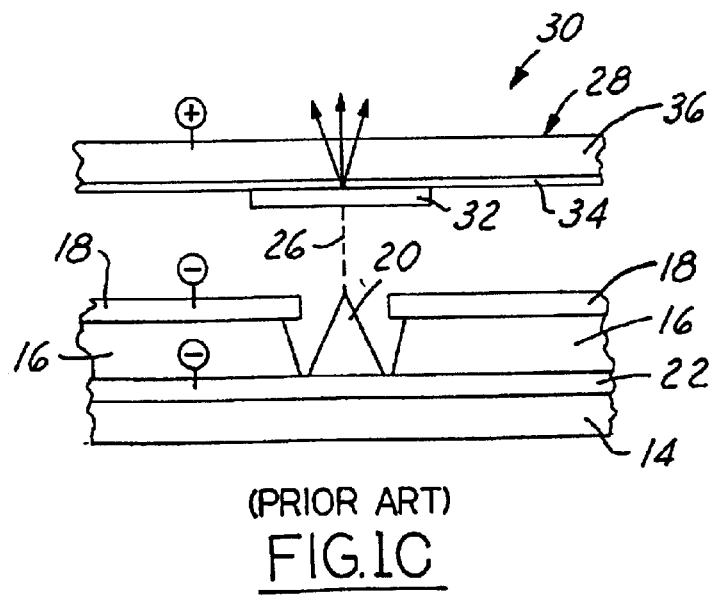
FIG. 1C is an enlarged, partial cross-sectional view of the conventional field device of FIG. 1B illustrating the structure of a single microtip.
Figure 2A:
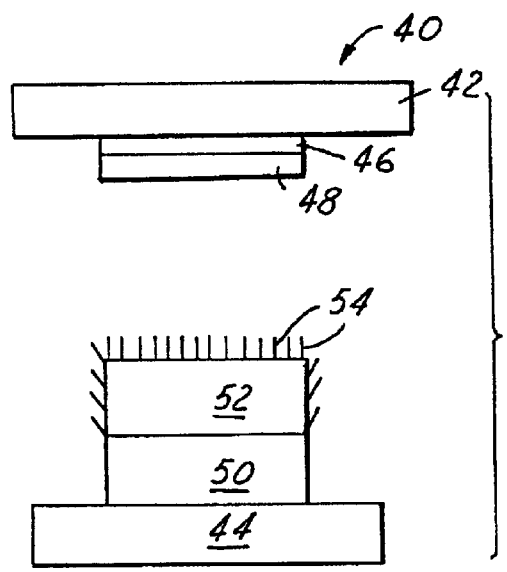
FIG. 2A is an enlarged, cross-sectional view of a conventional diode FED device with a layer of carbon nanotube deposited on a layer of conductive paste.
Figure 2B:
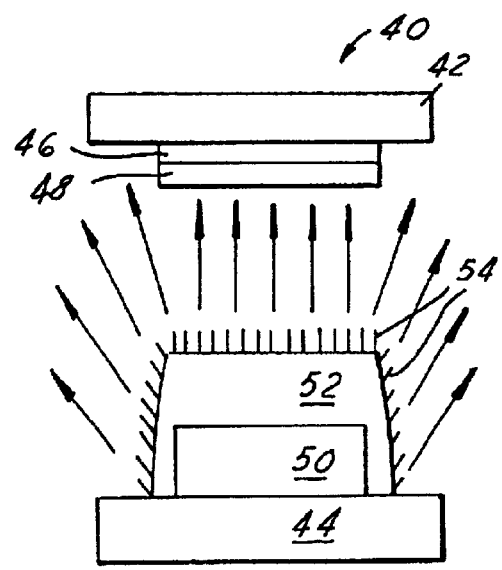
FIG. 2B is an enlarged, cross-sectional view of the conventional diode structure of FIG. 2A after a curing process is conducted for the nanotube layer.
Figure 4B:
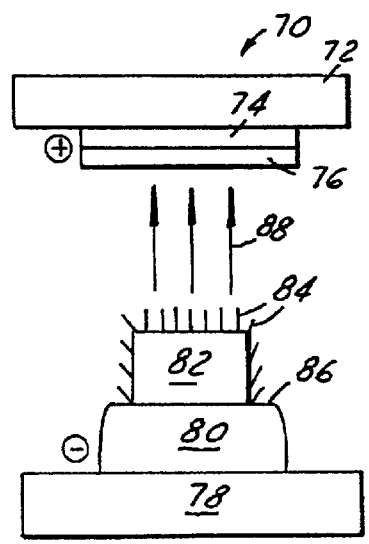
FIG. 4B is an enlarged, cross-sectional view of the present invention diode structure FED device of FIG. 4A after a curing process for the nanotube meter layer is conducted.

After a curing process for the carbon nanotube layer is conducted, i.e. at a temperature between about 400° C. and about 500° C. for a time period between about 50 min and about 60 min, as shown in FIG. 4B, the nanotube emitter layer 82 flows under gravity to a smaller height, but remains on the top surface 86 of the productive paste layer 80. As a result, when a negative charge is applied to the conductive paste layer 80, electrons 88 are ejected from the nanotubes 84 toward the flourescent powder coating layer 76 for effecting an image of the FED device 70. The scattering of electrons from the sidewalls of the conductive paste layer 80 is completely eliminated, when compared to that in the conventional device shown in FIG. 2B.

Figure 5A:
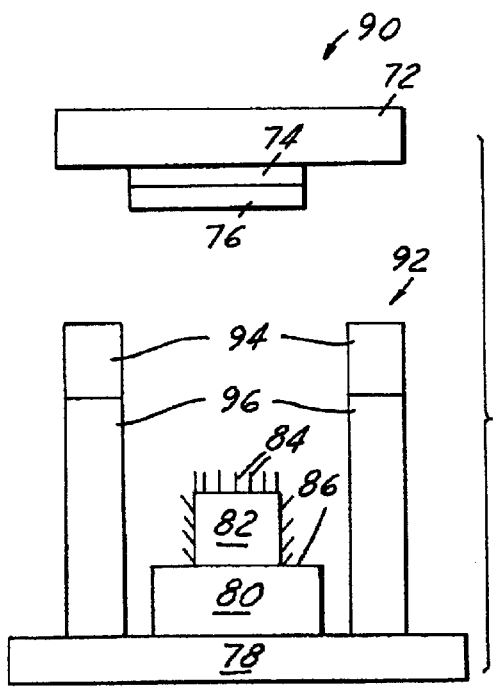
FIG. 5A is an enlarged, cross-sectional view of the present invention triode structure FED device with a nanotube emitter layer of reduced width deposited on a conductive paste layer.
Figure 5B:
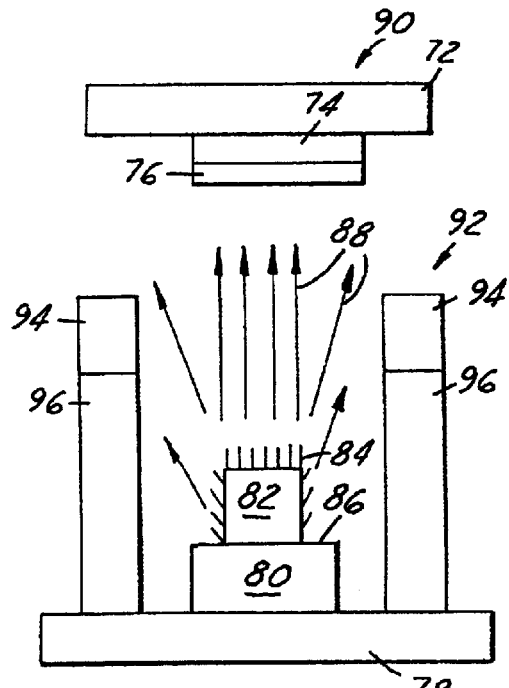
FIG. 5B is an enlarged, cross-sectional view of the present invention triode structure FED device of FIG. 5A after a curing process is conducted for the nanotube emitter layer.

Similarly, in a triode structure FED device 90, shown in FIGS. 5A and 5B, which includes a third electrode of an anode 92 formed by a conductive paste layer 94 deposited on an insulating rib layer 96. After the curing process, the nanotubes 84 do not overflow to cover a sidewall of the conductive paste layer 80, this is shown in FIG. 5B. As a result, the greatest majority of electrons emitted from the nanotube emitter layer 82 reaches the flourescent powder coating layers 76 effecting a much improved imaging on the FED device 90.

Figure 3A:
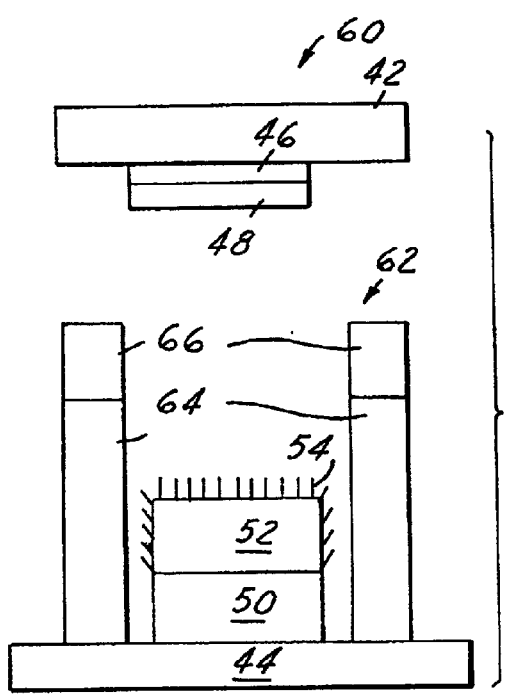
FIG. 3A is an enlarged, cross-sectional view of a conventional triode structure FED device with a carbon nanotube layer deposited on a conductive paste layer.
Figure 3B:
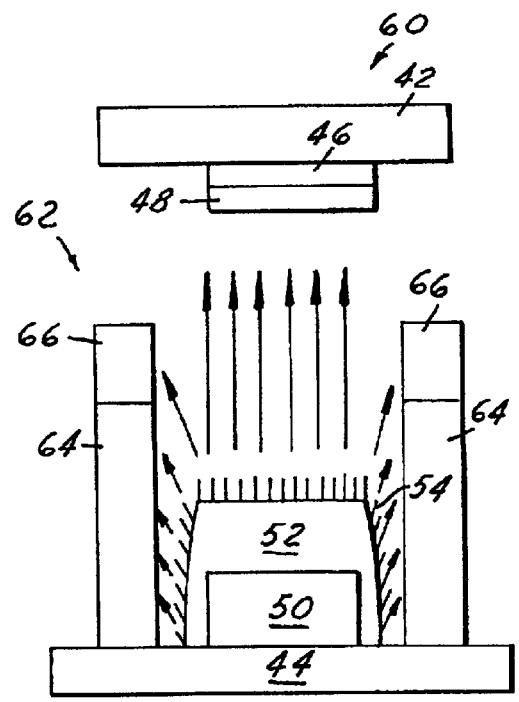
FIG. 3B is an enlarged, cross-sectional view of the conventional triode structure device of FIG. 3A after a curing process for the nanotube emitter layer.

The present invention novel structure therefore provides a much improved thick film printed electron emission source either in a diode or in a triode structure CNT-FED (Carbon Nanotube Field Emission Device). After the thick film deposition process and the curing process is conducted, the present invention structure presents a much improved device when compared to that fabricated by the conventional method shown in FIGS. 2B and 3B. The characteristics of the present invention structure is that the thickness is significantly smaller, i.e., between about 1 $\mu$m and about 10 $\mu$m, while the width of the nanotube emitter layer is smaller than the silver paste layer in the carbon nanotube emitter.

The present invention thick film printing formed electron emission source therefore presents numerous benefits which include: (1) It eliminates alignment difficulties between the carbon nanotubes and the conductive paste layer; (2) It improves the distribution of the electrons projected toward the flourescent coating layer; (3) It reduces the scatting of electrons emitted from the carbon nanotubes; (4) It reduces the electrical capacitance of the dielectric layer; and (5) It increases the uniformity and contrast ratio of the image produced on the FED device.

The present invention novel apparatus of the field emission display panel and a method for fabricating such panel with a carbon nanotube layer having a reduced width compared to the conductive paste layer onto which it is deposited have therefore been amply described in the above description and in the appended drawings of FIGS. 4A, 4B, 5A and 5B.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A field emission display panel comprising:
   a first electrically insulating plate;
   a plurality of emitter stacks formed on said first electrically insulating plate, each of said emitter stacks being positioned parallel to a transverse direction of said first insulating plate and comprises a layer of a first electrically conductive material having a first width and a layer of nanotube emitter having a second width on top, said second width being less than ¾ of said first width;
   a second electrically insulating plate positioned over and spaced-apart from said first electrically insulating plate having an inside surface facing said first plate;
   a layer of a second electrically conductive material on said inside surface of said second insulating plate;
   a multiplicity of strips of fluorescent powder coating on said second electrically conductive material each for emitting a red, green or blue light upon activation by electrons emitted from said plurality of emitter stacks; and
   a plurality of side panels joining peripheries of said first and second electrically insulating plates together forming a vacuum-tight cavity therein.

2. A field emission display panel according to claim 1, wherein said second width of said layer of nanotube emitter being between about ¼ and about ¾ of said first width of said layer of first electrically conductive material.

3. A field emission display panel according to claim 1, wherein said second electrically insulating plate further comprises a black matrix layer in-between said multiplicity of strips of fluorescent powder coating.

4. A field emission display panel according to claim 1, further comprising a second layer of said first electrically conductive material formed on top of a plurality of rib sections for functioning as a second anode.

5. A field emission display panel according to claim 1, wherein said layer of a first electrically conductive material is a cathode for said field emission display panel.

6. A field emission display panel according to claim 1, wherein said layer of a first electrically conductive material is a silver paste.

7. A field emission display panel according to claim 1, wherein said layer of second electrically conductive material is a first anode for said field emission display panel.

8. A field emission display panel according to claim 1, wherein said layer of second electrically conductive material is formed of indium-tin-oxide (ITO).

9. A field emission display panel according to claim 1, wherein said layer of nanotube emitter being formed of a mixture of nanometer dimensioned hollow tubes and a binder material.

10. A field emission display panel according to claim 1, wherein said layer of nanotube emitter being formed of a mixture of nanometer dimensioned hollow tubes of carbon, diamond or diamond-like carbon and a polymeric-based binder.

11. A field emission display panel according to claim 1, wherein each of said multiplicity of strips of fluorescent powder coating emits a light of red, green or blue that is different than the light emitted by its immediate adjacent strips when activated by electrons from said plurality of emitter stacks.

12. A field emission display panel comprising:
   a first electrically insulating plate;
   a plurality of emitter stacks formed on said first electrically insulating plate, each of said emitter stacks being positioned parallel to a transverse direction of said first insulating plate and comprises a layer of a first electrically conductive material having a first width and a layer of nanotube emitter having a second width on top, said second width being less than ¾ of said first width;
   a second electrically insulating plate positioned over and spaced-apart from said first electrically insulating plate having an inside surface facing said first plate, said first and second electrically insulating plates are formed of a ceramic material that is substantially transparent;
   a layer of a second electrically conductive material on said inside surface of said second insulating plate;
   a multiplicity of strips of fluorescent powder coating on said second electrically conductive material each for emitting a red, green or blue light upon activation by electrons emitted from said plurality of emitter stacks; and
   a plurality of side panels joining peripheries of said first and second electrically insulating plates together forming a vacuum-tight cavity therein.

13. A field emission display panel according to claim 12, wherein said second width of said layer of nanotube emitter being between about ¼ and about ¾ of said first width of said layer of first electrically conductive material.

14. A field emission display panel according to claim 12, wherein said second electrically insulating plate further comprises a black matrix layer in-between said multiplicity of strips of fluorescent powder coating.

15. A field emission display panel according to claim 12, wherein said layer of a first electrically conductive material is a cathode for said field emission display panel.

16. A field emission display panel according to claim 12, wherein said layer of a first electrically conductive material is a silver paste.

17. A field emission display panel according to claim 12, wherein said layer of nanotube emitter being formed of a mixture of nanometer dimensioned hollow tubes and a binder material.

18. A field emission display panel according to claim 12, wherein said layer of nanotube emitter being formed of a mixture of nanometer dimensioned hollow tubes of carbon, diamond or diamond-like carbon and a polymeric-based binder.

19. A field emission display panel according to claim 12, further comprising a second layer of said first electrically conductive material formed on top of a plurality of rib sections for functioning as a second anode.

* * * * *